W. D. SIMPSON.
CUSHION WHEEL.
APPLICATION FILED MAY 18, 1912.
1,056,597.
Patented Mar. 18, 1913.
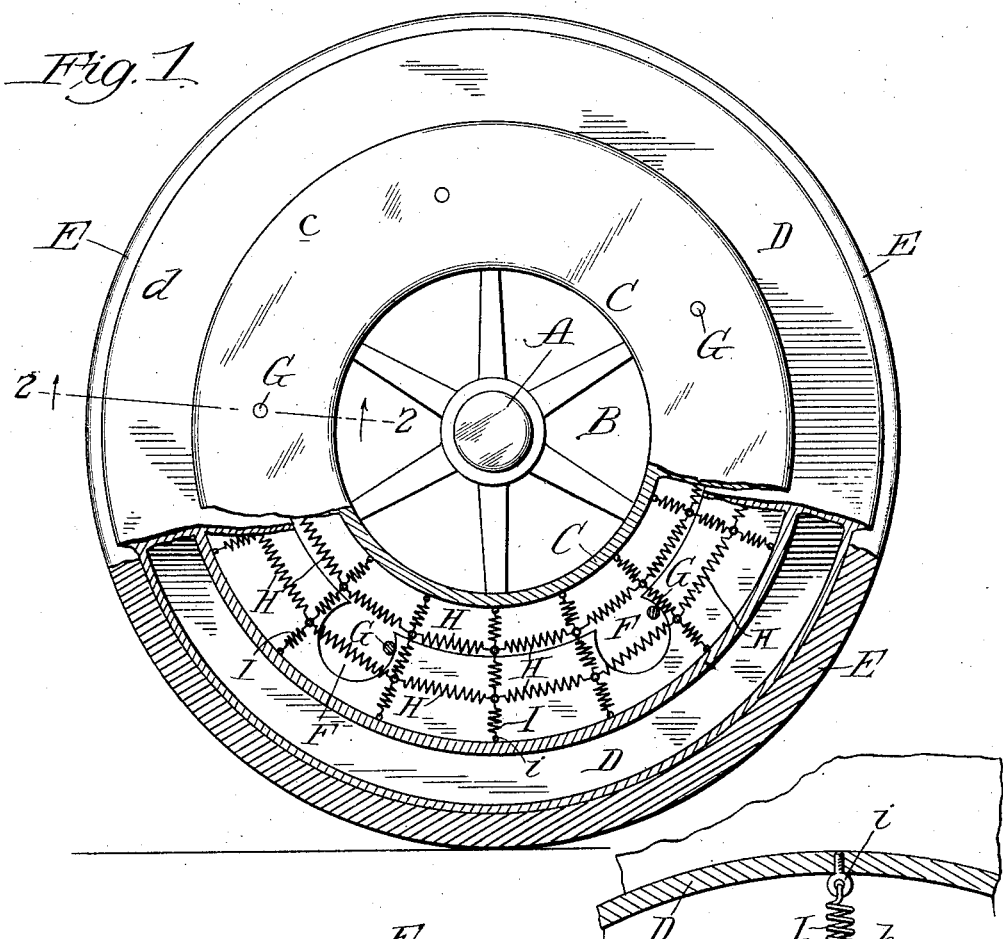
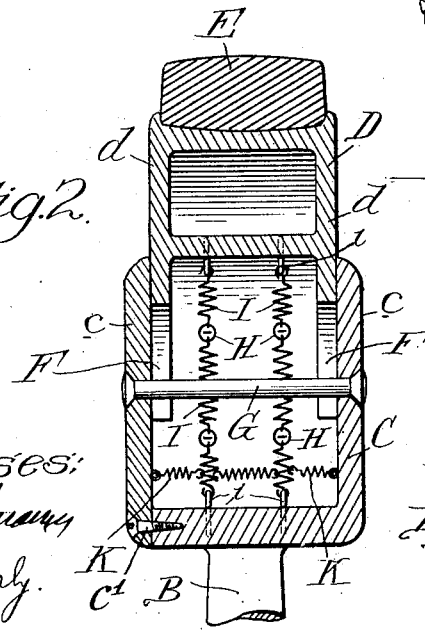
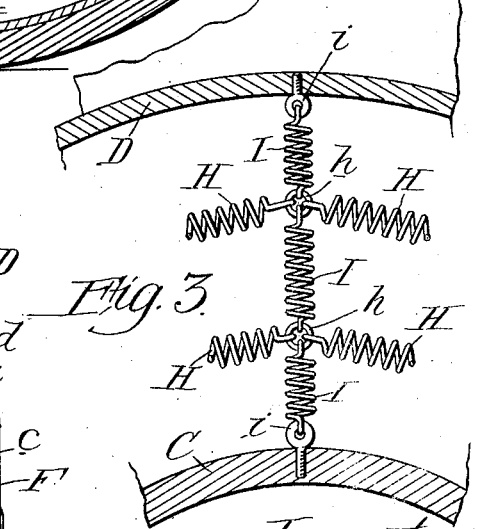
Inventor:
W. D. Simpson
By his Attorneys:

UNITED STATES PATENT OFFICE.

WILLIAM D. SIMPSON, OF COLUMBIA, SOUTH CAROLINA.

CUSHION-WHEEL.

1,056,597.  Specification of Letters Patent.  Patented Mar. 18, 1913.

Application filed May 18, 1912. Serial No. 698,112.

*To all whom it may concern:*

Be it known that I, WILLIAM D. SIMPSON, a citizen of the United States, residing at Columbia, in the county of Richland and State of South Carolina, have invented certain new and useful Improvements in Cushion-Wheels, of which the following is a specification.

This invention relates to wheels of the class in which provision is made for absorbing shocks or vibrations and increasing the traction of the wheel by means of a tire which is constructed to yield radially as the wheel rotates and is subjected to varying strains. Wheels with pneumatic tires are now almost universally used for this purpose, but such tires when punctured or slightly ruptured are rendered inoperative and furthermore are very expensive.

The object of my invention is to provide wheels of this class, with novel means for absorbing shocks or vibrations and increasing the traction, which are comparatively inexpensive and which are not rendered inoperative by ordinary wear, puncture or rupture of the tread.

According to this invention I make the hub and spokes of the wheel of the usual construction and I provide an inner rim attached or connected in any suitable way with the spokes, and an outer rim which is movable radially with reference to the hub. The two rims have flanges which overlap each other and these prevent sidewise movement of the outer rim, and the inner rim is free to move to a limited extent circumferentially with reference to the outer rim, being confined in such movement by means of cross bars carried by the inner rim and projecting through openings or recesses in the flanges of the outer rim.

Between the inner and outer rim I arrange coiled metallic springs in a novel manner, which are connected to both the inner and outer rims, serve to normally hold them concentric the proper distance apart, but which yield when obstructions are encountered in a manner similar to that of the air tube of a pneumatic tire.

In the accompanying drawings, Figure 1 is a view partly in side elevation and partly in vertical section of an automobile wheel embodying my improvements. Fig. 2 shows a transverse section on the line 2—2 of Fig. 1. Fig. 3 is an enlarged detail section view showing the manner of connecting the circular springs with the inner and outer rims.

The hub A and spokes B of the wheel are of usual, or may be of any approved, construction. On the outer ends of the spokes there is an inner rim C having outwardly projecting side flanges c one of which is separately formed and applied by screws c'. The outer rim D has side flanges d disposed between the flanges of the inner rim. Both rims may be made of metal, and the outer rim is preferably provided with a soft tread E of any suitable material. The flanges d are formed with openings or recesses F through which extend cross bars G attached to the flanges c of the inner rim, the construction being such that the outer rim may move radially inward and outward and the inner rim may move to a limited extent circumferentially relatively to the outer rim. The advantage of this construction is that the inner rim is prevented from "spinning" relatively to the outer rim, as would be the case if means were not provided for preventing it.

Between the inner and outer rims are arranged a continuous set of springs H. I have shown four sets of such springs as this is preferred. Each set may be considered a continuous spring, although it may be made up of sections as indicated. Each circular series of spring sections is connected with both the inner and the outer rims. This may be done, as shown in Fig. 1, by means of radially arranged springs I which may be attached by securing devices $i$ to the inner and outer rims in the manner indicated. Each connection may be made by short lengths of springs, as shown, and where the springs I join springs H, rings $h$ may be employed for making the connection, although other devices might be used for the same purpose. If desirable, springs K, shown in Fig. 2, may be employed for connecting the radial springs with the side flanges c. Normally the springs hold the inner and outer rims concentric with the axis of the wheel and the springs are made strong enough to so hold the rims under ordinary conditions, but when an obstruction is encountered the springs will yield and give the desired resiliency to the wheel until the obstruction is passed, when the normal position of the parts will be assumed.

I claim as my invention:

1. A wheel, comprising inner and outer rims movable relatively to each other, means for limiting the movement of the inner rim circumferentially relatively to the outer rim, spiral springs arranged circumferentially and continuously around the inner rim and between it and the outer rim and out of contact with both rims, and radially arranged spiral springs connected with the circumferential springs and also connected with both the inner and outer rims and affording the sole means for connecting the circumferentially arranged springs with the inner and outer rims.

2. A wheel, comprising inner and outer rims movable relatively to each other, means for limiting the movement of the inner rim circumferentially relatively to the outer rim, a series of spiral springs flexibly connected together and arranged circumferentially continuously around the inner rim and between it and the outer rim, and a series of radially arranged spiral springs connected to the circumferentially arranged springs and also connected with both the inner and outer rims.

In testimony whereof, I have hereunto subscribed my name.

WILLIAM D. SIMPSON.

Witnesses:
R. E. CARWILE,
JAMES A. CATHCART.

Copies of this patent may be obtained for five cents each, by addressing the "Commissioner of Patents, Washington, D. C."